(12) United States Patent
Jouppi et al.

(10) Patent No.: US 7,383,048 B2
(45) Date of Patent: Jun. 3, 2008

(54) TRANSMISSION OF DATA PACKETS BY A NODE

(75) Inventors: Jarkko Jouppi, Tampere (FI); Janne Rinne, Tampere (FI)

(73) Assignee: Nokia Corporation, Espoo (FI)

( * ) Notice: Subject to any disclaimer, the term of this patent is extended or adjusted under 35 U.S.C. 154(b) by 1076 days.

(21) Appl. No.: 10/309,766

(22) Filed: Dec. 4, 2002

(65) Prior Publication Data

US 2004/0109455 A1 Jun. 10, 2004

(51) Int. Cl.
*H04Q 7/20* (2006.01)
(52) U.S. Cl. .................. 455/452.2; 455/557; 370/329; 370/312; 370/310.1; 370/342; 370/349
(58) Field of Classification Search .............. 370/329, 370/312, 310.1, 342, 349; 455/557, 452.2
See application file for complete search history.

(56) References Cited

U.S. PATENT DOCUMENTS

| | | | |
|---|---|---|---|
| 6,608,832 B2 * | 8/2003 | Forslow | 370/353 |
| 6,834,044 B2 * | 12/2004 | Sugirtharaj et al. | 370/328 |
| 7,209,491 B2 * | 4/2007 | Zheng et al. | 370/477 |
| 2002/0120749 A1 | 8/2002 | Widegren et al. | |

FOREIGN PATENT DOCUMENTS

| | | |
|---|---|---|
| EP | 1 170 909 | 1/2002 |
| WO | 9939480 | 8/1999 |
| WO | WO 00/10357 | 2/2000 |
| WO | WO 00/48310 | 8/2000 |
| WO | 0076230 | 12/2000 |
| WO | WO 01/20946 | 3/2001 |
| WO | WO 02/30056 | 4/2002 |

OTHER PUBLICATIONS

3GPP Technical Specification 23.228, Version 5.6.0, "*IP Multimedia Subsystem (IMS)*," Stage 2 (Release 5), 2002.
Internet Draft, "*IPv6 Flow Label Specification*" by J. Rajahalme, A. Conta, B. Carpenter and S. Deering, Jun. 2002.
RFC 3260, "*New Terminology and Clarifications for Diffserv*" by D. Grossman, Apr. 2002.
RFC 3041, "*Privacy Extensions for Stateless Address Autoconfiguration in IPv6*" by T. Narten and R. Draves, Jan. 2001.
RFC 1971 "*IPv6 Stateless Address Autoconfiguration*" by S. Thomson and T. Narten, Aug. 1996.

* cited by examiner

*Primary Examiner*—Nghi H. Ly
(74) *Attorney, Agent, or Firm*—Alfred A. Fressola; Ware, Fressola, Van Der Sluys & Adolphson LLP

(57) ABSTRACT

The invention relates to a method for supporting a transmission of data packets from a node attached to a mobile communication network to a first unit. In order to enable a second unit providing or forwarding the data packets to the node to influence the QoS for the transmission, it is proposed that the method comprises transmitting data packets of a specific data flow from the node to the first unit using a quality of service treatment which is selected based on a quality of service treatment associated with a quality of service identifier. The quality of service identifier is inserted by a second unit to each packet of the specific data flow. The invention relates equally to a terminal equipment, to a node, to a mobile communication network and to a system comprising means for realizing the proposed method.

32 Claims, 4 Drawing Sheets

TRANSMISSION OF DATA PACKETS BY A NODE

FIELD OF THE INVENTION

The invention relates to a method for supporting a transmission of data packets from a node, which is attached to a mobile communication network, to some unit. The invention relates equally to a unit providing or forwarding data packets to a node attached to a mobile communication network, to such a node, to such a mobile communication network and to a system comprising such a node.

BACKGROUND OF THE INVENTION

It is known from the state of the art to enable terminal equipment to access a mobile communication network, e.g. a 3GPP (3rd generation partnership project) network, via a node which is attached to the mobile communication network. Thereby, a terminal equipment device, e.g. a portable computer, is able to exchange data with a peer device, e.g. an Internet server, via the mobile communication network. The node may be realized for example by a mobile terminal, which can be connected physically or via the air interface with the terminal equipment device.

An important aspect of such an environment which has not been standardized yet is the quality of service (QoS) management for involved packet switched data transmissions.

Currently, there is no effective way for a terminal equipment device to request a QoS profile for a data flow. A QoS profile can only be requested by a terminal equipment device through AT commands. AT commands, however, are quite clumsy, and it is not likely that terminal equipment applications would start to configure AT commands extensively in order to have the needed QoS. AT commands are moreover not scalable to scenarios where several QoS profiles are needed simultaneously.

Known flexible QoS management solutions do not take account of requirements by terminal equipment accessing a mobile communication network via a node which is attached to this network.

Document WO 00/76230 A1 proposes a method to control the PDP (packet data protocol) context of a data packet in a mobile terminal, which contains one or several applications performing packet format data transfer. First, a data packet is received from an application. The data packet contains a first identifier to identify the application that has created the packet. Then, input data pertaining to this application is received. The input data contains information about one or several data flows of the application. On basis of the input data, a PDP context is defined for each data flow of the application. Further, a second identifier indicating the data flow is added to the data packet. Finally, the departing data packet is classified into a PDP context on basis of the first and the second identifier.

Document WO 99/39480 A2 aims at supporting a flexible determination of the QoS in packet switched transmissions between a wireless communication device and an information network. The wireless communication device accesses a radio network, and data transmissions between the mobile terminal and the radio network are controlled by an access point controller. For setting up an Internet connection, the required QoS for the connection is determined, for example centrally by the access point controller. Then, it is attempted to establish the connection in the wireless communication network with parameters complying with the set QoS.

A possibility for enabling terminal equipment accessing the information network via the wireless communication device to influence the employed QoS is not dealt with in documents WO 00/76230 A1 and WO 99/39480 A2.

Similar problems may occur in other, similar environments, in which a unit desires to ensure a specific QoS for the transmission of data packets from a node which is attached to a mobile communication network to some other unit.

The mentioned problems are also of particular relevance for IP Multimedia Core Network Subsystems (IMS).

IMS was introduced in 3GPP Release 5 and is intended to provide IP (Internet protocol) based telephony and multimedia sessions with security and charging on top of 3G RAN (radio access network) and packet core infrastructure. In addition to basic telephony services, IMS should be able to provide SIP (session initiation protocol) based presence and messaging services. IMS can also be used to set up sessions related to all types of services, such as network gaming.

In IMS sessions, media is delivered directly from user equipment to user equipment, or from user equipment to Media Gateway or Media Resource Function, e.g. in RTP/UDP/IP (real time protocol/user datagram protocol/Internet protocol) packets. For this, end-to-end QoS is required in RAN, GPRS (general packet radio service) and IP core network (CN). However, session establishment, modification and teardown (i.e. the signaling plane) using the SIP protocol requires several application level servers, such as Call State Control Functions (CSCF). The role of CSCFs is to route the session establishment, to interact with authentication and accounting, and to act as the focal point in session related services through the interaction with UMS (unified messaging service) and Application Servers. UMS is a central repository for all subscriber-related data, including the authentication keys.

IMS interacts with Circuit Switched (CS) networks such as a PSTN (public switched telephone network) through Media Gateways and Media Gateway controllers. A subscriber is also able to roam between IMS and CS CN domain.

In theory IMS is completely independent of RAN and GPRS, i.e. it only requires an IP packet transport with a requested QoS from them. For example, IMS registration and authentication are completely separate and independent from the GPRS procedures. However, in reality IMS interfaces with GPRS to tie together the authorization of an IMS session and a PDP context carrying media for it. The main benefit from this to the operator is the ability to combine GPRS and IMS services and charging. However, separate GPRS and IMS subsystems are also possible without this kind of tight coupling. An IMS-GPRS interface is used to handle situations in which a user equipment leaves radio coverage or shuts down during an existing IMS session. This indication is needed in IMS to release session related state. The interaction between IMS and RAN is minimal. In some situations it would be beneficial for an IMS functional element to know which kind of radio interface a user equipment is using to optimize session related procedures, e.g. media streams or the usage of message compression.

IMS and a services subsystem interact with each other directly. From IMS point of view, a services subsystem is a combination of Application Servers, which can offer session-related services to subscribers. The interaction happens from Serving CSCF using an ISC (international switching center) protocol interface. A services subsystem is also able to offer non-session related services, such as instant messaging, push and presence to IMS endpoints.

IMS is built based on IETF (Internet engineering task force) protocols, such as SIP, SDP (session description protocol), RTP and Diameter. In some cases, extensions to these protocols are needed to either add new functionality, to optimize their usage in wireless environment or to utilize existing Release 99 solutions. The preferred way has been to do extensions, not modifications.

SUMMARY OF THE INVENTION

It is an object of the invention to enable a unit providing or forwarding packet switched data to a node which is attached to a mobile communication network to efficiently influence a QoS employed for transmitting the data further from the node to some other unit.

A further object of the invention is a method for supporting a transmission of data packets from a node, which is attached to a mobile communication network, to a first unit is proposed, which comprises transmitting data packets of a specific data flow from the node to the first unit using a quality of service treatment which is selected based on a quality of service treatment associated with a quality of service identifier. The quality of service identifier is inserted by a second unit to each packet of the specific data flow. The selection of a quality of service treatment based on a quality of service treatment associated with a quality of service identifier means that either exactly this associated quality of service treatment is used or that a quality of service treatment as close as possible under the given circumstances to the associated quality of service treatment is used.

The node can be a stationary node or a mobile node, for example a 3GPP mobile terminal. In the following, each reference to a node without an additional explanation relates to this node.

Equally, a unit providing or forwarding the data packets to a node, a node and a mobile communication network are proposed which comprise means for realizing the proposed method on their side. Further, a system is proposed which comprises at least a first unit, a second unit and a node with respective means for realizing the proposed method.

The invention proceeds from the idea that data packets which are transmitted by some unit to a node can be classified for further transmission from the node to another unit based on a QoS identifier included in each of the packets themselves. The classification can be based more specifically on an available association between the QoS identifier and a specific QoS treatment. When a QoS treatment has been determined based at least on a transmitted QoS identifier and on the available association, the respective data packet can be transmitted to the other unit corresponding to this determined QoS treatment. Thus, the invention enables a mapping of QoS concepts which are understood at the unit providing or forwarding the data packets into QoS concepts and parameters which are understood at the node.

It is an advantage of the invention that the second unit or an application within the second unit can request a specific QoS for a transmission without having an exact knowledge on the underlying access technology. The second unit can use for the transmission of the QoS identifier concepts that are known by itself, for instance a Flow label, a DiffServ codepoint or an IPv6 (Internet protocol version 6) Interface ID (identifier).

It is further an advantage of the invention that it enables a simultaneous use of different QoS treatments for transmitting different data flows from the second unit over a node to the first unit.

Preferred embodiments of the invention become apparent from the dependent claims.

The invention is suited for any QoS channel creation, typically on layer 2. It can be employed for example for creating a QoS channel between the node and the mobile communication network, between the node and a terminal equipment or between the node and a personal area network, e.g. via Bluetooth™. Thus, the first and the second unit can correspond to various units of a communication system. The first unit, to which the data packets are to be transmitted from the node, can be for example a network unit of the mobile communication network, a terminal equipment accessing the node or a personal area network to which the node has an access. The second unit, which provides or forwards the data packets to the node for further transmission, can be for example a terminal equipment accessing the node, a network unit of the mobile communication network or a terminal equipment which is connected to the node via the mobile communication network.

Moreover, there are different possibilities for transmitting the data packets from the node to the first unit using a specific QoS treatment. The QoS treatment may be provided for example by a specific connection, like a PDP context, which was activated based on a suitable QoS profile. All data packets comprising a QoS identifier associated with this QoS profile can then be forwarded to this connection. Alternatively, a logical connection between the QoS identifier and some function may be provided, and this function is then responsible for achieving a specific QoS. For an uplink transmission, for example, such a logical connection can consist in a DiffServ codepoint setting in the node depending on the QoS identifier received from the first unit. For a transmission in downlink direction using a Bluetooth™ local link, the logical connection can consist for example in a priority bit in the BNEP (Bluetooth Network Encapsulation Protocol) layer set depending on the QoS identifier received from the first unit.

There are basically two approaches for making the association between a specific QoS identifier and a specific QoS treatment available.

In a first approach, the association between a specific QoS identifier and a specific QoS treatment is determined by the second unit itself. In that case, the second unit may also assemble the QoS parameters for a QoS profile representing a specific QoS treatment according to its needs. The QoS profile should then be provided by the second unit to the node together with the QoS identifier in a signaling packet before the actual data flow starts, or at least at the beginning of the actual data flow. If the node is managing the QoS channels for the transmission of the data flows to the first unit, there can be a QoS parameter mapping in the node from the QoS parameters provided by the second unit to the parameters required for the respective QoS channel.

For the first approach, there are several possibilities of signaling the QoS profile together with the QoS identifier to the node.

The signaling employed for conveying the QoS identifier and the QoS profile from the second unit to the node is based on a signaling protocol between the second unit and the node. The nature of the used signaling protocol might be end-to-end, e.g. from a terminal equipment constituting the second unit to a peer unit, like the RSVP (resource reservation protocol) or the outcome of IETF (Internet Engineering Task Force) Next Steps In Signaling (NSIS) working group. Alternatively, it may be a local signaling method between the node and the second unit. The signaling might even be a part of some local media signaling, e.g. a Bluetooth™ specific protocol, even though this is not the most preferred solution because of its local media dependency. Another option is to use a SDP/SIP based signaling, but that has the disadvantage of being restricted only to applications using SDP/SIP, and furthermore it requires application level (SIP proxy) functionality in the signaling elements.

In case an end-to-end signaling protocol is employed, the node checks the contents of signaling packets when they arrive and forwards the signaling messages unchanged towards the peer. The node then uses the given information for activating the access network connection. If appropriate, the node may use the information in addition for a local media QoS activation between the node and the second unit, e.g. a terminal equipment accessing the node. It can be said in general that the signaled QoS information can be used at least for any Layer 2 QoS channel setup, and in both directions from the point of view of the node.

Corresponding downlink end-to-end signaling messages coming from the peer unit towards the second node, for example a terminal equipment accessing the node, can also be inspected in the node, e.g. in order to formulate in a 3GPP environment a Traffic Flow Template (TFT) to a gateway GPRS support node (GGSN) of a UMTS (universal mobile telecommunication services) PLMN (public land mobile network), and possibly in order to setup a QoS channel towards the terminal equipment in a local/personal area network of the node. The node transmits given values of TCP/UDP/IP (transport control protocol/user datagram protocol/Internet protocol) address fields to the GGSN for the identification of a data flow. The TFT contains one or more so called packet filters. These packet filters allow the arrangement of a mapping of data packets to the correct PDP context providing a QoS negotiated in a PDP context activation signaling.

Preferably, an IP based signaling is employed for QoS information signaling from and to the second unit, since an IP based signaling is independent of the local media, of the application used and of the access network of the mobile communication network which the node is accessing.

The signaling messages of the employed signaling protocol could moreover be enhanced with access network specific features that could carry for example an Access Point Name needed for GPRS/UMTS networks and a QoS Authorization and Binding information needed for IMS usage.

In a second approach, the association between specific QoS identifiers and a specific QoS treatment, e.g. in the form of specific QoS classes and/or profiles, is pre-determined. At the second unit, at least the available QoS identifiers and associated QoSs are known, in order to enable the second unit to select a QoS identifier which is to be inserted in the packets of a specific data flow. In addition, the association between specific QoS identifiers and specific QoS treatments is at least either known at the node or in the mobile communication network. If the association is known at the node, the node uses the appropriate QoS treatment for transmitting the data packets, e.g. by activating a connection to the mobile communication network corresponding to the associated QoS profile and by forwarding the data packets to this connection. If the data packets are to be transmitted by the node to the mobile communication network and if the association is known in the mobile communication network, the QoS identifier in received data packets is first forwarded by the node to the communication network, and the network can then check which QoS treatment is actually to be ensured by the connection to which the data packets are to be forwarded.

There are also several options for transmitting the QoS identifier in the packets of a data flow from the second unit to the node.

Advantageously, the QoS identifier is included in a header field of the packets of a data flow. Three header fields which are suitable for transporting the QoS identifier in a 3GPP system will be presented in the following by way of example.

In a preferred embodiment of the invention, the QoS identifier is transmitted in the 20-bit Flow label field of the IP header of data packets, which is particularly suited for receiving a QoS identifier. A flow label which is set by some node is not altered by routers in the end-to-end path, and it can be freely chosen by the sender, or by the receiver if desired. The flow label was initially meant for Quality of Service purposes but a specific usage has not yet been proposed. In the Internet draft draft-ietf-ipv6-flow-label-02.txt: "IPv6 Flow Label Specification", 2002, the following is stated: "To enable the peer(s) to know the assigned or requested Flow Label value, the value SHOULD be included along with the Source and Destination addresses as part of any signaling dealing with the flow, e.g. transport layer connection set up, RSVP for resource reservation, or SDP for media session parameters." If the 20-bit Flow label field is used for transmitting the QoS identifier according to the invention, the usage of the Flow label is enhanced by defining that the Flow label selected by the second unit, preferably in combination with IP source and destination addresses comprising a so called 3-tuple, is associated with a specific QoS treatment.

In an alternative embodiment of the invention, the Differentiated Services Codepoint (DSCP) in the Differentiated Services (DiffServ) field in the IP header of the data packets is used as QoS identifier. By the IETF definition in RFC 3260: "New Terminology and Clarifications for Diffserv", 2002, the Differentiated Services field is the six most significant bits of the (former) IPv4 TOS octet or the (former) IPv6 Traffic Class octet. The DSCP is a value which is encoded in the DiffServ field, and which each DiffServ node must use to select the Per-Hop-Behavior (PHB) which is to be experienced by each packet it forwards. Thus, the DiffServ field is well suited to indicate what kind of QoS is needed for a specific data flow. As DSCP, the well-known codepoints standardized in IETF, i.e. 'Assured Forwarding', 'Expedited Forwarding', and 'Best Effort', can be used. Alternatively, some local usage DSCPs could be used as well. The DiffServ field can be used with the first approach, in which the association between QoS identifier and QoS treatment is provided by the second unit, but preferably it is used with the second approach, in which the association between QoS identifier and QoS treatment is pre-defined. In the latter case, the QoS treatment associated with the respective codepoint can be defined either by the node or by the network.

In a further embodiment of the invention, the IP address which is assigned to a node can be used as the QoS identifier. To this end, the QoS identifier is associated in addition to an interface of the second unit.

In the beginning of the year 2002, the 3GPP standards were changed so that the IPv6 addresses assigned to mobile nodes are 64 bit prefixes rather than complete 128 bit addresses. As a result, a user equipment may define Interface IDs by using an arbitrary suffix of up to 64 bits for the IPv6 address, as long as it uses a prefix part allocated by a GGSN of the mobile communication network. Moreover, a terminal equipment device has to be able to choose an Interface ID, in order to be accordant with the RFC 3041: "Privacy Extensions for Stateless Address Autoconfiguration in IPv6", 2001. RFC 3041 states that the terminal can freely and any time select and change its Interface ID. The signaling method between a terminal equipment device and a mobile node should therefore also support a change of the suffix on the fly, if the terminal equipment device for some reason wants to change it.

Thus, various interface IDs of the second unit accessing a node can be associated with various quality of services used for transmissions from the node to the first unit. For example, a dedicated connection can be activated between the node and the first unit for a specific QoS. Since moreover, each connection can have its own QoS, a one-to-one mapping between the Interface IDs and different QoS treatments can be realized. The second unit may thus requests a specific QoS treatments for a certain Interface, and all data packets sent to or received from this interface gets the QoS negotiated by the node for the corresponding connection to the first unit. The connection can be given by any Layer 2 QoS channels, e.g. by a PDP connection.

The invention can be employed for a 3G specific solution, but equally for other solutions, e.g. in wireless LANs (local area networks) and other access technologies.

The invention not only can be employed for transmitting data packets from the second unit to the first unit with a desired QoS, but also can be employed for transmitting data packets from the first unit to the second unit using this QoS. It can also help in the local media level when directing packets to correct local media pipes, e.g. Bluetooth™, with certain QoS characteristics.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that they are merely intended to conceptually illustrate the structures and procedures described herein.

DETAILED DESCRIPTION OF THE INVENTION

Three embodiments of the method according to the invention will be described in the following, all three being implemented in a system in which a terminal equipment device accesses, by way of example, a UMTS based mobile communication network via a mobile terminal. The mobile terminal thus constitutes for the terminal equipment device a mobile node of the mobile communication network.

The mobile terminal is attached in a known manner via an UTRAN (UMTS terrestrial RAN) to a core network of the mobile communication network. The core network comprises inter alia a GGSN. A GGSN is a switch which provides an access to other networks for packet switched data flows, e.g. to the Internet. The mobile terminal is able to exchange user data with the GGSN by means of a logical connection called PDP context. At least one PDP address is allocated to the mobile station, for which several PDP contexts can be opened in the system.

The first embodiment of the method according to the invention is based on the evaluation of Flow label values.

Figure 1:
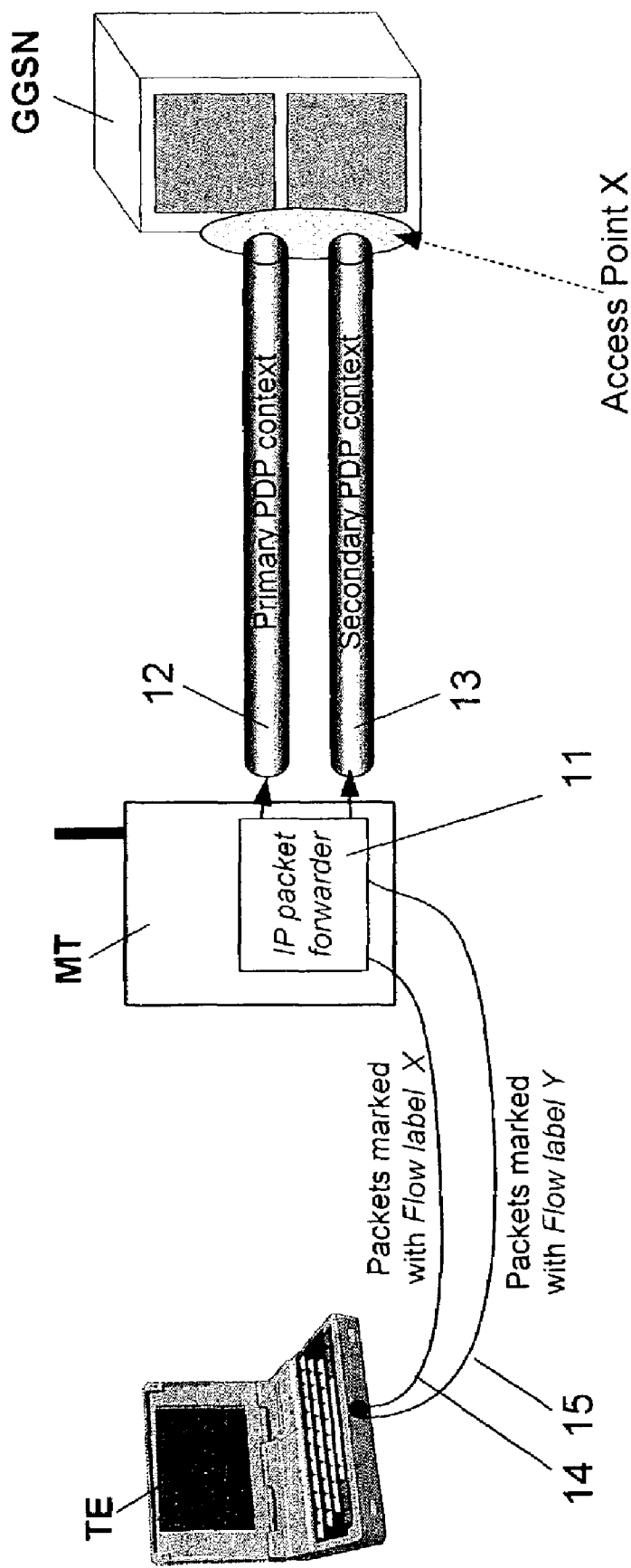
FIG. 1 schematically shows a part of a system in which a first embodiment of the method according to the invention is implemented.

FIG. 1 shows a system in which the first embodiment of the method according to the invention is implemented. The system comprises the mentioned terminal equipment device TE, the mentioned mobile terminal MT and the mentioned GGSN. An access point of the GGSN for the mobile terminal is referred to as access point X. A packet switched data flow consisting of a plurality of IP packets is to be transmitted between the terminal equipment device TE and a peer device via the mobile terminal MT and the GGSN. The mobile terminal MT comprises to this end an IP packet forwarder 11.

Figure 2:
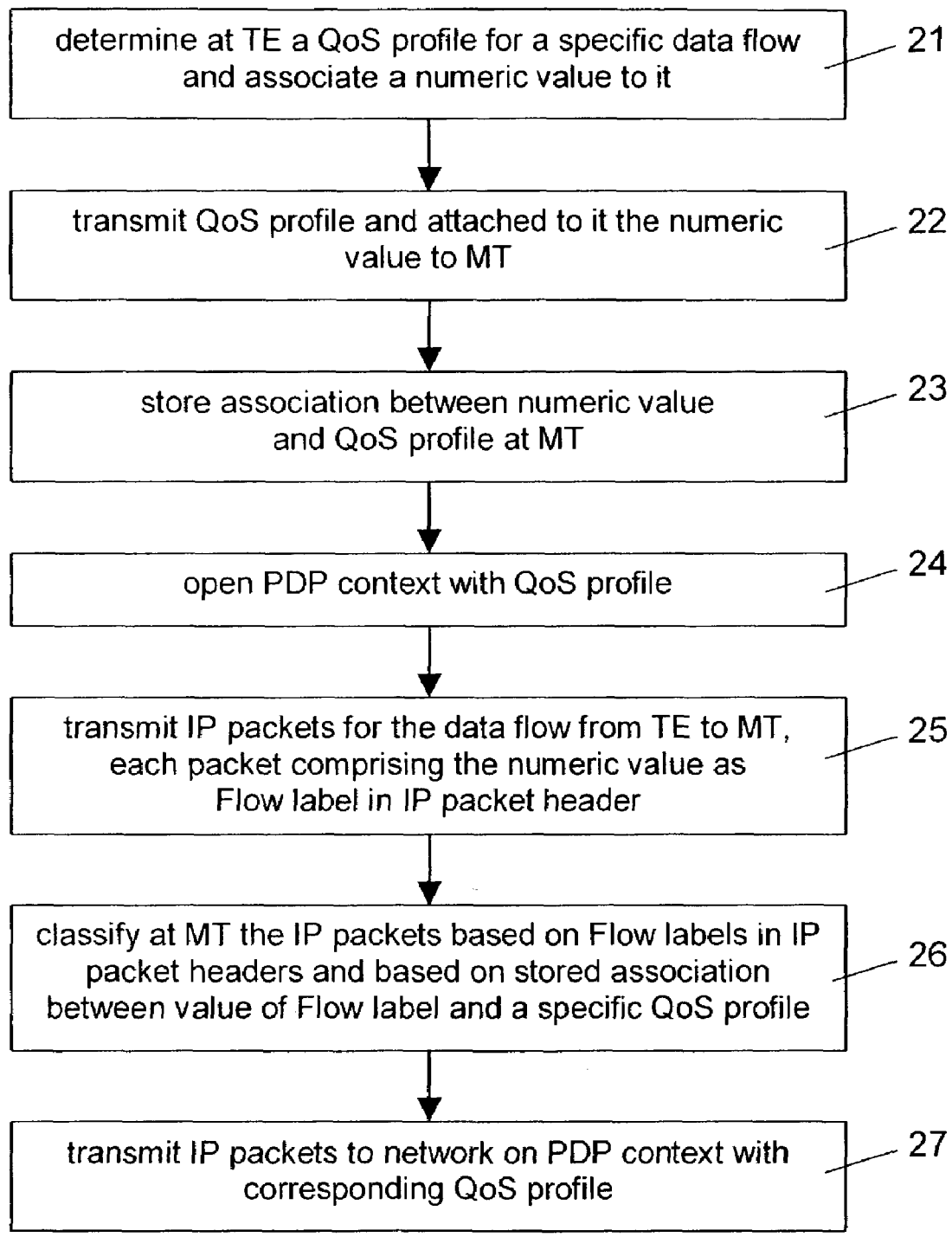
FIG. 2 is a flow chart illustrating the first embodiment of the method according to the invention.

The first embodiment of the method according to the invention implemented in the system of FIG. 1 is illustrated in FIG. 2 and comprises two phases. The first phase relates to triggering an appropriate PDP context between the mobile terminal MT and the GGSN for a specific data flow, while the second phase relates to directing IP packets of the data flow to the correct PDP context.

In the first phase, the terminal equipment device TE or an application in the terminal equipment device TE determines in a first step 21 a QoS profile for a specific data flow that is to be transmitted via the mobile terminal MT and the GGSN to a peer device. The QoS profile is to be used more specifically at least for the transmission of IP packets between the mobile terminal MT and the GGSN and consists of some generic QoS parameters. In addition, the terminal equipment device TE or an application in the terminal equipment device TE selects a numeric value X.

In a next step 22, the terminal equipment signals the determined QoS profile, attached to this profile the selected numeric value X, and the used IP destination and source addresses to the mobile terminal MT using an end-to-end NSIS signaling protocol.

The IP packet forwarder 11 of the mobile terminal MT checks the content of all received signaling packets, in order to detect an included QoS profile and an associated numeric value, and forwards the signaling messages unchanged towards the peer unit. The IP layer of the mobile terminal MT can recognize the signaling messages from the 'Next Header' field of an IPv6 header or the 'Protocol' field of an IPv4 header. In case a signaling packet includes a QoS profile and one or more associated numeric value(s), the IP packet forwarder 11 then stores the detected information including the indicated IP destination and source addresses in step 23. Further, it activates in step 24 a connection to the UTRAN for triggering a primary PDP context to the GGSN corresponding to the detected QoS profile. The established primary PDP context 12 is indicated in FIG. 1. Alternatively to storing the received QoS profile with an association to the received numeric value(s), IP destination address and source address, the mobile terminal MT may also store an indication of the established PDP context 12 with an association to the received numeric value(s), IP destination address and source address.

The terminal equipment device TE or an application in the terminal equipment device TE may determine at any time further QoS profiles for other data flows, select other numeric values Y for these QoS profiles and transmit the respective information to the mobile terminal MT. The IP packet forwarder 11 of the mobile terminal MT will detect and store the respective information and open a further PDP context to the GGSN for each additional QoS profile. An established first secondary PDP context 13 is also indicated in FIG. 1.

While the QoS signaling traverses through the end-to-end path, all nodes in-between may use the signaling information for local purposes, like the activation of PDP contexts or other access network connections. In the same way the local media between the terminal equipment device TE and the mobile terminal MT, e.g. Bluetooth™, may use the signaling information to activate correct QoS pipes and directing packets into them.

In the second phase of the first embodiment, the terminal equipment device TE or an application in the terminal equipment device TE assembles IP packets for a specific data flow destined for some peer unit. The numeric value which was associated in the first phase to the QoS profile for this data flow is inserted to the 20-bit Flow label field of the IPv6 header of each of the IP packets. The numeric value in the Flow label field and the source and destination IPv6 addresses which are coupled with the flow label form together a unique identifier.

The assembled IP packets are then transmitted by the terminal equipment device TE in step 25 to the mobile terminal MT. Such a transmission is indicated in FIG. 1 for IP packets of a first data flow marked with a first Flow label X as transmission 14 and for IP packets of a second data flow marked with a second Flow label Y as transmission 15.

Based on the stored numeric values, the IP addresses and the associated QoS profiles, the IP packet forwarder 11 of the mobile terminal MT is able to perform in step 26 a classification of received IP packets on the IP level. To this end, the IP packet forwarder 11 first inspects the IP headers of packets originating from the terminal equipment device TE. The mobile terminal MT thus comprises to some extend the functionality of an IP router. The IP packet forwarder 11 does not have to be a real router with complex and heavy routing protocols, though. It only has to be able to check the IP headers and to comprise static rules indicating where to put each IP packet based on the included Flow label and IP addresses in its header. The mobile terminal MT is thus actually an IP router or "forwarder" with some lower layer intelligence, as it directs packets to correct PDP contexts, based on IP header fields.

During the inspection of the IP headers, the IP packet forwarder 11 of the mobile terminal MT detects the Flow label in the IP header of received IP packets. Then, it compares the detected Flow label and the associated IP addresses with the stored numeric values and IP addresses, and it determines either the QoS profile or directly the PDP context associated with the stored numeric value and IP addresses which correspond to the detected Flow label and the associated IP addresses.

Performing the packet classification on the IP level rather than going deeper to UDP or TCP headers is of advantage, since these transport protocol headers and contents might be encrypted, and it is more effective to operate on Internet protocol headers.

In step 27, finally, the IP packet forwarder 11 forwards the IP packets into the PDP context which was established specifically for the QoS profile associated with the Flow label of the IP packet. The GGSN receives the IP packets and forwards them further towards the peer unit.

In downlink direction, the PDP context mapping is done by the GGSN according to information provided by the mobile terminal MT. This information is received by the mobile terminal MT as well in the signaling from the terminal equipment device TE.

The second embodiment of the method according to the invention is based on the evaluation of IPv6 addresses containing a 64 bit prefix and an arbitrary 64 bit suffix.

Figure 3:
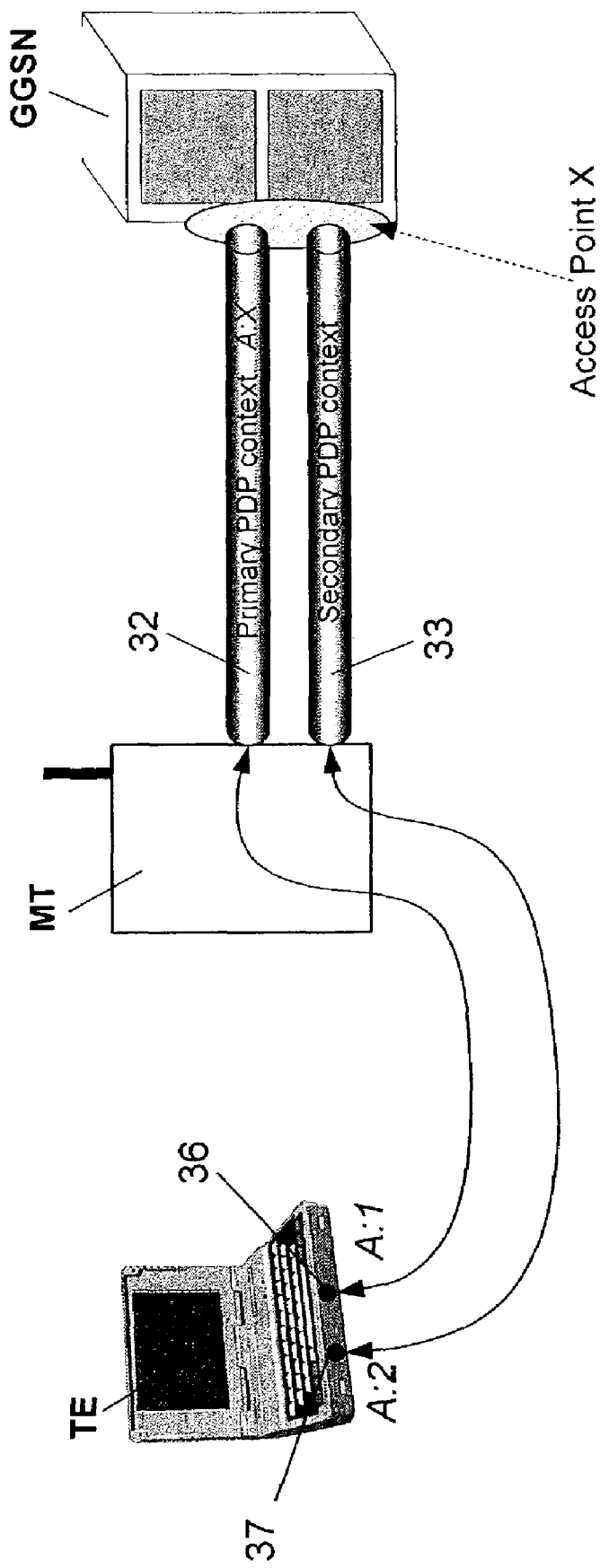
FIG. 3 schematically shows a part of a system in which a second embodiment of the method according to the invention is implemented.

FIG. 3 shows a system in which the second embodiment of the method according to the invention is implemented. The depicted components of the system are the same as in FIG. 1, i.e. they comprise a terminal equipment device TE, a mobile terminal MT and a GGSN. Again, a packet switched data flow consisting of a plurality of IP packets is to be transmitted between the terminal equipment device TE and a peer device via the mobile terminal MT and the GGSN.

In the beginning, the GGSN has allocated a 64-bit prefix A and some default suffix as PDP address to the mobile terminal MT.

Also the second embodiment comprises a first phase which relates to triggering an appropriate PDP context between the mobile terminal MT and the GGSN for a specific data flow, and a second phase which relates to directing IP packets of the data flow to the correct PDP context.

In the first phase, the terminal equipment device TE or an application in the terminal equipment device TE determines a default QoS profile for data flows which are transmitted via a first interface 36 of the terminal equipment device TE to the mobile terminal MT and further via the GGSN to some peer unit. The QoS profile is to be used again more specifically at least for the transmission of IP packets between the mobile terminal MT and the GGSN and consists of some generic QoS parameters.

In addition, the terminal equipment device TE or an application in the terminal equipment device TE selects a numeric value '1' comprising 64 bits. The numeric value '1' identifies the interface 36 and constitutes thus an interface ID. At the same time, it identifies the special QoS profile.

The QoS profile and the interface ID are transmitted by the terminal equipment device TE to the mobile terminal MT via some appropriate signaling protocol or method.

The mobile terminal MT determines thereupon a PDP address A:X for a new PDP context. For this PDP address A:X, the mobile terminal MT combines the fixed 64-bit prefix A and the received interface ID '1' as a 64-bit suffix. Before the new address can be used, however, a Duplicate Address Detection as defined in RFC 1971: "IPv6 Stateless Address Autoconfiguration", 1996, is performed. This is necessary for the case that several terminal equipment devices are connected to the same mobile terminal MT. Since these terminal equipment devices might share the same address space, there a risk that the same suffix is allocated for more than one terminal equipment device.

In a next step, the mobile terminal MT activates a primary PDP context 32 corresponding to the received default QoS profile. Further, the mobile terminal MT creates and stores a logical connection between the interface ID and the primary PDP context.

Then, the terminal equipment device TE or an application within the terminal equipment device TE needs a special QoS profile for some other data traffic, e.g. a streaming video, and it provides the required QoS profile to the mobile terminal MT through an appropriate signaling method. Along with the requested QoS profile, the terminal equipment device TE conveys a numeric value '2' comprising 64 bits. The numeric value '2' identifies the interface 37 of the terminal equipment device TE which is to be used for the data traffic and constitutes thus as well an interface ID. At the same time, the numeric value '2' identifies the special QoS profile.

After a negative Duplicate Address Detection, the mobile terminal MT activates a secondary PDP context 33 with the newly received QoS profile, employing as PDP address A:X a combination of the fixed 64-bit prefix A and the received interface ID '2' as a 64-bit suffix. The prefix part of the address is thus the same as the prefix part of the PDP address for the primary PDP context 32, while the suffix part X is different. Due to the identical prefix A, the PDP addresses of both PDP contexts 32, 33 are considered nevertheless as the same PDP address. Further, the mobile terminal MT creates a logical connection between the newly defined Interface ID '2' and the secondary PDP context 33.

In the second phase, the established logical connections between the Interface IDs '1', '2' and the PDP contexts 32, 33 can be used in the mobile terminal MT to filter uplink IP packets to correct PDP contexts.

By default, the terminal equipment device TE or the peer host/server, respectively, mark IP packets that are to be transmitted between them with the suffix '1' in the PDP address, such that the IP packets are transmitted via the primary PDP context 32 and thus with the default QoS profile. These data flows leave or enter the terminal equipment device TE via interface 36.

But whenever the QoS profile of the secondary context is needed, the packets are marked by the terminal equipment device TE or the peer host/server, respectively, with the suffix '2' in the PDP address. As a result, these IP packets are transmitted via the secondary PDP context 33 with the special QoS profile negotiated by the mobile terminal MT for the secondary PDP context 33. These data flows leave or enter the terminal equiment device TE via interface 37.

This scenario can be extended further by adding more secondary PDP contexts corresponding to specific QoS profiles and more associated suffixes, in order to have different kinds of QoS profiles for various traffic flows.

It has to be noted, though, that the interface IDs may be changed by a terminal equipment device also due to other reasons, e.g. when using Privacy Extensions according to the above cited RFC 3041. Moreover, in IMS usage, the full address of a node of 128 bits is registered to the IMS network, and it is thus not feasible in this case to register several addresses for different QoS profiles.

The third embodiment of the method according to the invention is based on the usage and evaluation of the codepoint in the DiffServ field in the header of IP packets. Currently, this embodiment is only applicable to non-IMS access cases.

Figure 4:
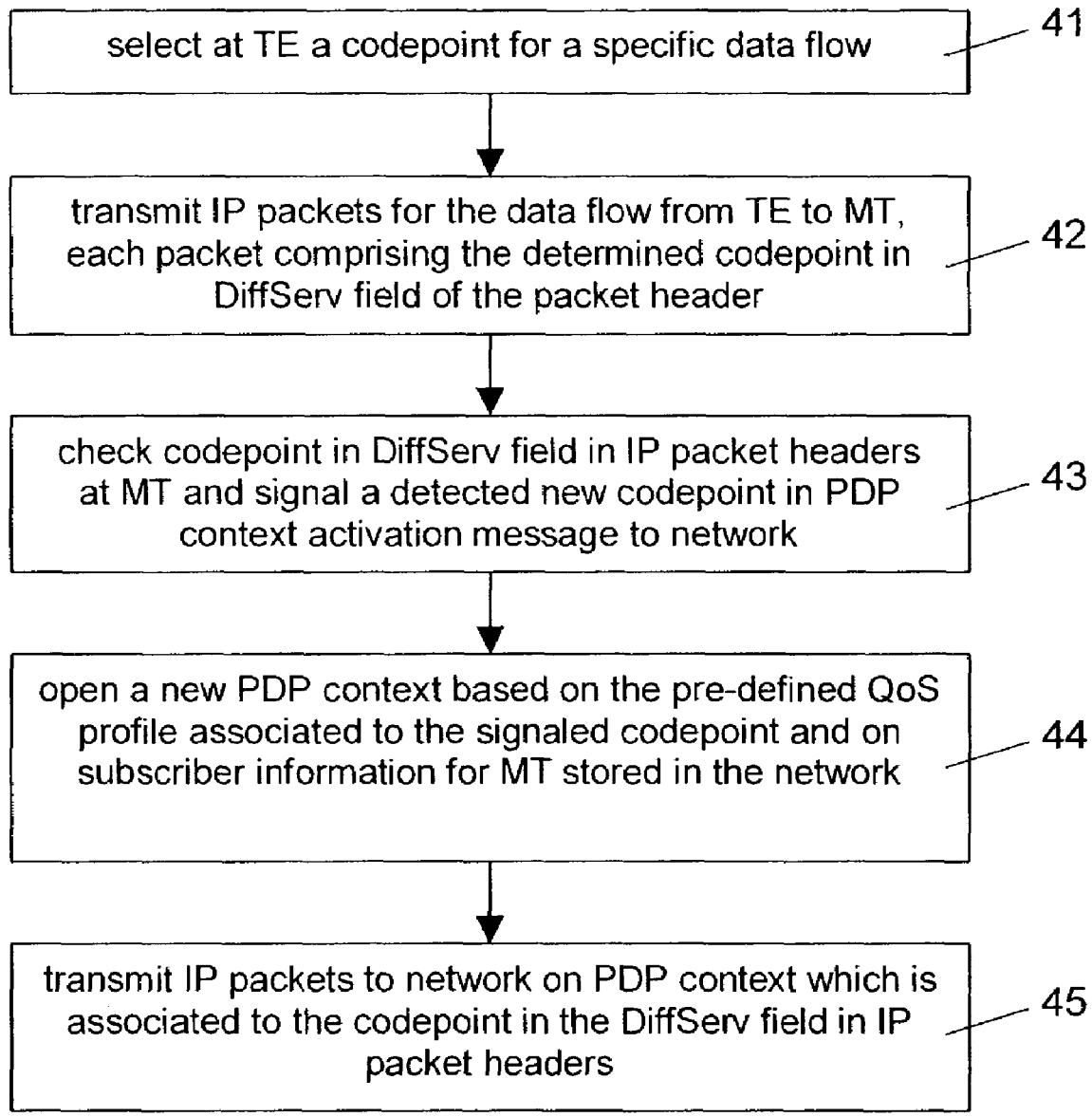
FIG. 4 is a flow chart illustrating a third embodiment of the method according to the invention.

FIG. 4 is a flow chart illustrating the third embodiment of the method according to the invention. The system in which it is implemented comprises again a terminal equipment, a mobile terminal and a GGSN, as the systems depicted in FIGS. 1 and 3. Again, a packet switched data flow consisting of a plurality of IP packets is to be transmitted between the terminal equipment device and a peer device via the mobile terminal and the GGSN.

In the third embodiment, an association between specific codepoints and specific QoS profiles is pre-defined and stored at least in the network, typically in the SGSN (serving GPRS support node) of the core network. As codepoints, the standardized codepoints 'Assured Forwarding', 'Expedited Forwarding', and 'Best Effort' are used. The QoS profiles which are associated with the codepoints are defined by the network.

When a data flow is to be transmitted by the terminal equipment device to some peer unit, the terminal equipment device or an application in the terminal equipment device determines in a first step 41 a codepoint which is suitable for this data flow. The terminal equipment device then encodes this codepoint into the DiffServ field of each IP packet of the data flow.

In a next step 42, the terminal equipment transmits the IP packets of the data flow immediately to the mobile terminal via some default connection. In contrast to the first and the second embodiment, there is no preparatory phase in the third embodiment before transmitting the IP packets to the mobile terminal.

The mobile terminal checks in step 43 the codepoints in the DiffServ field of the header of all received IP packets. When checking the first packets of a new data flow, the mobile terminal recognizes the use of a new codepoint for which no PDP context has been opened so far, and transmits a PDP context activation message to the GGSN. In this message, the mobile terminal includes the detected codepoint.

The GGSN determines the pre-determined QoS profile which is associated with the codepoint received in the PDP context activation message. It compares this QoS profile with the subscription information and limitations of the mobile terminal and decides on the actual 3GPP QoS parameters that can be used for the requested PDP context. Then, the GGSN opens in step 44 a PDP context corresponding to these QoS parameters.

In step 45, the mobile terminal directs all IP packets of a data flow received from the terminal equipment device comprising the codepoint associated with a specific QoS into the opened PDP context which was opened under consideration of this QoS.

Alternatively, the mobile terminal itself could associate received codepoints to pre-defined QoS profiles and trigger immediately a PDP context corresponding to a respectively determined QoS profile.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising transmitting data packets of a specific data flow from a node, which node is attached to a mobile communication network, to a first unit using a quality of service treatment which is selected based on a quality of service treatment associated with a quality of service identifier, which quality of service identifier was inserted by a second unit to each packet of said specific data flow as a suffix of an Internet protocol address, wherein said quality of service identifier is associated in addition to a specific interface of said second unit via which said data flow is transmitted by said second unit.

2. The method according to claim 1, wherein said first unit is one of a network unit of said mobile communication network, a terminal equipment accessing said node and a unit of a personal area network accessing said node.

3. The method according to claim 1, wherein said second unit is one of a terminal equipment accessing said node, a network unit of said mobile communication network and a terminal equipment which is connected to said node via said mobile communication network.

4. The method according to claim 1, wherein said data packets are transmitted from said node to said first unit using a specific connection, wherein said specific connection is established taking into account said quality of service treatment associated with said quality of service identifier.

5. The method according to claim 1, wherein said data packets are transmitted from said node to said first unit making use of a logical connection between said quality of service identifier and a function which is needed to achieve said quality of service treatment associated with said quality of service identifier.

6. The method according to claim 1,
wherein said quality of service identifier is associated by said second unit to a specific quality of service treatment; and
wherein a quality of service profile representing said quality of service treatment is signaled by said second unit at least to said node together with said quality of service identifier previous to a transmission of packets of said data flow to said node.

7. The method according to claim 1, wherein said first unit is a network unit of said mobile communication network, wherein said quality of service identifier is associated by said second unit to a specific quality of service treatment, wherein a signaling message is employed for transmitting said quality of service identifier together with a quality of service profile representing said associated quality of service treatment at least to said node previous to a transmission of packets of said data flow to said node, and wherein said signaling message is enhanced with features which are specific for an access network of said mobile communication network to which said node is attached.

8. The method according to claim 1, wherein said second unit is a terminal equipment, wherein said quality of service identifier is associated by said terminal equipment to a specific quality of service treatment, wherein a signaling message is employed for transmitting said quality of service identifier together with a quality of service profile representing said associated quality of service treatment by said terminal equipment end-to-end via said node to a peer device previous to a transmission of packets of said data flow to said node, and wherein at least one other node forwarding said signaling message uses said information in said signaling message for local purposes.

9. The method according to claim 1, wherein said first unit is a network unit of said mobile communication network, wherein an association between said quality of service identifier and a specific quality of service treatment is pre-defined and known at least in said mobile communication network, wherein said node signals a quality of service identifier to said mobile communication network when receiving data packets comprising said quality of service identifier, and wherein said mobile communication network determines a quality of service profile which is used for establishing a connection for transmitting said data packets between said node and said network unit based on said pre-defined quality of service treatment associated with said signaled quality of service identifier.

10. The method according to claim 1, wherein said quality of service identifier is included in a header of each packet of said data flow transmitted by said second unit.

11. The method according to claim 1, wherein said quality of service identifier comprises a numeric value which is included in a flow label field of a header of each packet of said data flow transmitted by said second unit and wherein said quality of service identifier comprises in addition a source and a destination IP (Internet protocol) address coupled with said flow label.

12. The method according to claim 1, wherein said quality of service identifier comprises a numeric value which is encoded as a differentiated services codepoint into a differentiated services field in the header of each packet of said data flow transmitted by said second unit.

13. The method according to claim 1, wherein said first unit is a network unit of said mobile communication network, wherein said quality of service identifier is forwarded by said node to said mobile communication network and wherein said mobile communication network decides on a quality of service profile which is to be used for establishing a connection for transmitting said data packets to said network unit based on said quality of service identifier and on subscription information stored for said node.

14. The method according to claim 1, wherein an association between said quality of service identifier and a specific quality of service treatment is pre-defined and known at least at said node.

15. The method according to claim 14, wherein said first unit is a network unit of said mobile communication network, and wherein said node activates a connection to said network unit with a quality of service profile representing said quality of service treatment associated with said quality of service identifier when receiving data packets comprising said quality of service identifier for transmitting said data packets to said network unit.

16. A unit comprising:
a transmitting component configured to transmit data packets via a node which is attached to a mobile communication network to another unit; and
a processing component configured to insert into each data packet of a specific data flow a quality of service identifier as a suffix of an Internet protocol address, wherein said quality of service identifier is associated with a specific quality of service treatment desired for a transmission of packets of said data flow at least from said node to said other unit and in addition to a specific interface of said unit via which said data flow is to be transmitted by said unit.

17. The unit according to claim 16, wherein said processing component is configured to associate said quality of service identifier to a specific quality of service treatment, and wherein said transmitting component is configured to signal a quality of service profile representing said quality of service treatment to said node together with said quality of service identifier previous to a transmission of packets of a data flow.

18. The unit according to claim 16, wherein said unit is one of a terminal equipment accessing said node, a network unit of said mobile communication network and a terminal equipment which is connected to said node via said mobile communication network.

19. The unit according to claim 16, wherein said other unit is a network unit of said mobile communication network, and wherein said processing component is configured to associate said quality of service identifier to a specific quality of service treatment, to employ a signaling message for transmitting said quality of service identifier together with a quality of service profile representing said associated quality of service treatment at least to said node previous to a transmission of packets of said data flow to said node, and to enhance said signaling message with features which are specific for an access network of said mobile communication network to which said node is attached.

20. The unit according to claim 16, wherein said unit is a terminal equipment, and wherein said processing component is configured to associate said quality of service identifier to a specific quality of service treatment and to employ a signaling message for transmitting said quality of service identifier together with a quality of service profile representing said associated quality of service treatment end-to-end via said node to a peer device previous to a transmission of packets of said data flow to said node.

21. The unit according to claim 16, wherein said processing component is configured to include said quality of service identifier in a header of each packet of said data flow transmitted by said transmitting component.

22. The unit according to claim 16, wherein said quality of service identifier comprises a numeric value, wherein said processing component is configured to include said numeric value in a flow label field of a header of each packet of said data flow transmitted by said transmitting component and wherein said quality of service identifier comprises in addition a source and a destination Internet protocol address coupled with said flow label.

23. The unit according to claim 16, wherein said quality of service identifier comprises a numeric value, and wherein said processing component is configured to encode said numeric value as a differentiated services codepoint into a differentiated services field in the header of each packet of said data flow transmitted by said transmitting component.

24. A node comprising:
a communication component configured to access a mobile communication network;
a receiving component configured to receive data packets from a second unit, which data packets are to be forwarded to a first unit; and
a packet forwarder configured to determine a quality of service identifier comprised as a suffix of an Internet protocol address in packets of a specific data flow received from the second unit, wherein said quality of service identifier is associated with a specific quality of service treatment desired for a transmission of said packets of said data flow at least from said node to said first unit and in addition with a specific interface of said second unit via which said data flow is transmitted by said second unit, and said packet forwarder being further configured to forward said data packets to said first unit using a quality of service treatment which is determined based on said quality of service treatment associated with said quality of service identifier.

25. A system comprising a first unit, a second unit according to claim 16 and a node, said node including:
a communication component configured to access a mobile communication network;
a receiving component configured to receive data packets from said second unit, which data packets are to be forwarded to said first unit; and
a packet forwarder configured to determine a quality of service identifier comprised as a suffix of an Internet protocol address in packets of a specific data flow received from said second unit, wherein said quality of service identifier is associated with a specific quality of service treatment desired for a transmission of said packets of said data flow at least from said node to said first unit and in addition with a specific interface of said second unit via which said data flow is to be transmitted by said second unit, and said packet forwarder being further configured to forward said data packets to said first unit using a quality of service treatment which is determined based on said quality of service treatment associated with said quality of service identifier.

26. The node according to claim 24, wherein said packet forwarder is configured to transmit said data packets to said first unit using a specific connection, wherein said specific connection is established taking into account said quality of service treatment associated with said quality of service identifier.

27. The node according to claim 24, wherein said packet forwarder is configured to transmit said data packets to said first unit making use of a logical connection between said quality of service identifier and a function which is needed to achieve said quality of service treatment associated with said quality of service identifier.

28. The node according to claim 24, wherein said first unit is a network unit of said mobile communication network, and wherein said node is configured to forward a received quality of service identifier to said mobile communication network.

29. The node according to claim 24, wherein said node is configured to know a pre-defined association between said quality of service identifier and a specific quality of service treatment.

30. The node according to claim 29, wherein said first unit is a network unit of said mobile communication network, and wherein said node is configured to activate a connection to said network unit with a quality of service profile representing said quality of service treatment associated with said quality of service identifier when receiving data packets comprising said quality of service identifier for transmitting said data packets to said network unit.

31. An apparatus comprising:
means for transmitting data packets via a node which is attached to a mobile communication network to another unit; and
means for inserting into each data packet of a specific data flow a quality of service identifier as a suffix of an Internet protocol address, wherein said quality of service identifier is associated with a specific quality of service treatment desired for a transmission of packets of said data flow at least from said node to said other unit and in addition with a specific interface of said apparatus via which said data flow is to be transmitted by said apparatus.

32. An apparatus comprising:
means for accessing a mobile communication network;
means for receiving data packets from a second unit, which data packets are to be forwarded to a first unit; and means for determining a quality of service identifier comprised as a suffix of an Internet protocol address in packets of a specific data flow received from a second unit, wherein said quality of service identifier is associated with a specific quality of service treatment desired for a transmission of said packets of said data flow at least from said apparatus to said first unit and wherein said quality of service identifier is associated in addition to a specific interface of said second unit via which said data flow is transmitted by said second unit, and for forwarding said data packets to said first unit using a quality of service treatment which is determined based on said quality of service treatment associated with said quality of service identifier.

* * * * *